US007644111B2

(12) United States Patent
Jaffri et al.

(10) Patent No.: US 7,644,111 B2
(45) Date of Patent: Jan. 5, 2010

(54) FRAMEWORK FOR CONTENT REPRESENTATION AND DELIVERY

(75) Inventors: Taqi Jaffri, Seattle, WA (US); Alexander V. Petrov, Bellevue, WA (US); Michael V. Sliger, Sammamish, WA (US); Thomas D. McGuire, Georgetown, TX (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/416,019

(22) Filed: May 2, 2006

(65) Prior Publication Data

US 2007/0260647 A1    Nov. 8, 2007

(51) Int. Cl.
*G06F 17/30* (2006.01)

(52) U.S. Cl. ....................... 707/203; 707/204

(58) Field of Classification Search ............ 707/203, 707/204, 200
See application file for complete search history.

(56) References Cited

U.S. PATENT DOCUMENTS

| 5,649,200 A * | 7/1997 | Leblang et al. | 717/122 |
| 5,897,642 A * | 4/1999 | Capossela et al. | 707/203 |
| 2005/0022175 A1* | 1/2005 | Sliger et al. | 717/169 |

* cited by examiner

*Primary Examiner*—Hung T Vy
*Assistant Examiner*—Angela M Lie

(57) ABSTRACT

In a content delivery scheme for target files, one or more recipes for each of the target files are encoded in an index. The index uses a framework that is able to represent content delivery schemes involving static containers, dynamic containers, self-contained containers, containers that are not self-contained, containers with internal delta dependency and containers with no internal delta dependency.

20 Claims, 11 Drawing Sheets

FRAMEWORK FOR CONTENT REPRESENTATION AND DELIVERY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Microsoft Corporation, All Rights Reserved.

BACKGROUND

Conventional data compression techniques use a compression engine that accepts one file as input and produces a compact version of that file as output. A corresponding decompression engine performs the inverse function, accepting the compact form as input and reconstructing the original file for output on the destination computer.

Differential compression is a different technique. It takes two files as input: a target file and a "basis" file, which is usually an older version of the target file. The compression engine determines the differences between the basis file and the target file and creates a compact "delta" file as output. On the destination computer, the decompression engine takes the existing basis file and the compact delta file as input and creates the target file as output. This is known as "applying the delta file to the basis file". If the basis file and the target file are very similar, the size of the delta file will be very small, generally much smaller than the file that results from simply compressing the target file conventionally. The size of the delta file is proportional to the number and nature of differences between the basis file and the target file.

The goal of a content delivery scheme is to produce a particular set of target files at a consumer's computer. Throughout, the term "consumer" is used to refer to the consumer of the content, and does not imply any monetary transaction. A content delivery scheme may be used, for example, when a software vendor releases a new product or a software upgrade, or has determined new virus signatures, spam rules, advertisement blocking rules, etc. The term "computer" not only includes mainframes, servers and personal computers (e.g., desktop, laptop and notebook computers), but also other devices capable of processing data, such as PDAs (personal digital assistants), mobile telephones (e.g. smartphones), set-top boxes, gaming consoles, handheld gaming devices, and embedded computing devices (e.g. computing devices built into a car or ATM (automated teller machine)).

A content delivery solution involves delivery to the consumer's computer of files and information necessary to produce the target files at the consumer's computer. Delivery of the files by the content provider or a third party may be, for example, via network transmission or using a physical medium such as a diskette, a compact disk or other physical medium. The files may be any kind of file, whether data, code, a document, a spreadsheet, a drawing, music, or something else.

For example, if there are three target files FileA, FileB and FileC, one solution is to create a conventional archive containing a single copy—possibly compressed—of each of these files, deliver the archive to the consumer's computer, and produce the target files by extracting—and if appropriate, decompressing—the contents of the archive at the consumer's computer. A non-exhaustive list of examples of conventional archives includes: WinZip®archives, "MICROSOFT®" CAB (cabinet) archives, TAR archives, GNU zip (GZIP) archives, bzip2 archives, RAR archives, and Java archives (JAR).

If one can assume the presence of an earlier version of each of these files at the consumer's computer, another solution is to create a delta archive containing the delta files that encode how each target file differs from its earlier version, deliver the delta archive to the consumer's computer, and produce the target files by extracting the contents of the archive and applying the delta files to the earlier versions to synthesize the target files at the consumer's computer.

Yet another possibility is to create an intra-package delta (IPD) package, as described in U.S. Patent Application Publication No. US 2005/0022175 to Sliger et al., published Jan. 27, 2005 and which is incorporated herein by reference. For example, this IPD package may contain a compressed copy of FileA, a delta file $\Delta(A \rightarrow B)$ that encodes how FileB differs from FileA, and another delta file $\Delta(A \rightarrow C)$ that encodes how FileC differs from FileA. The solution is to create this IPD package, deliver it to the consumer's computer, and produce the target files at the consumer's computer by extracting and decompressing the compressed copy of FileA, extracting the delta file $\Delta(A \rightarrow B)$ and applying it to FileA to synthesize FileB, and extracting the delta file $\Delta(A \rightarrow C)$ and applying it to FileA to synthesize FileC. Since there is an internal delta dependency, FileA must be produced before either of FileB or FileC can be produced. The order in which FileB and FileC are synthesized is not important in this example.

Obviously many other solutions are also possible. For example, another solution is to create an IPD package that contains a compressed copy of FileB, a delta file $\Delta(B \rightarrow A)$ that encodes how FileA differs from FileB, and the delta file $\Delta(A \rightarrow C)$. This solution includes delivering the IPD package to the consumer's computer, and producing the target files at the consumer's computer by extracting and decompressing the compressed copy of FileB, extracting the delta file $\Delta(B \rightarrow A)$ and applying it FileB to synthesize FileA, and extracting the delta file $\Delta(A \rightarrow C)$ and applying it to FileA to synthesize FileC. Due to the internal delta dependency, FileB must be produced first, then FileA and then FileC.

Yet another solution is to create what can be referred to as an extra-package delta (XPD) package, which is described briefly in U.S. Patent Application Publication No. US 2005/0022175. An XPD package differs from an IPD package in that at least one of its target files is produced by applying a delta file in the package to a basis file that is external to the package. For example, if one can assume the presence of an earlier version of FileC at the consumer's computer, the XPD package may contain a compressed copy of FileA, a delta file $\Delta(C \rightarrow B)$ that encodes how FileB differs from FileC, and a delta file $\Delta(C^{old} \rightarrow C)$ that encodes how FileC differs from its earlier version. The solution is to create this XPD package, deliver it to the consumer's computer, and produce the target files at the consumer's computer by extracting and decompressing the compressed copy of FileA, extracting the delta file $\Delta(C^{old} \rightarrow C)$ and applying it to the earlier version of FileC to synthesize FileC, and extracting the delta file $\Delta(C \rightarrow B)$ and applying it to FileC to synthesize FileB. Due to the internal delta dependency, FileC must be produced before FileB. FileA may be produced at any time independent of the production of the other target files.

If one can assume the presence of an earlier version of FileC at the consumer's computer, a further solution is to create an XPD package that contains the delta file $\Delta(C^{old} \to C)$, a delta file $\Delta(C \to B)$ that encodes how FileB differs from FileC, and a delta file $\Delta(C^{old} \to A)$ that encodes how FileA differs from the earlier version of FileC. The solution is to create this XPD package, deliver it to the consumer's computer, and produce the target files at the consumer's computer by extracting the delta file $\Delta(C^{old} \to C)$ and applying it to the earlier version of FileC to synthesize FileC, and extracting the delta file $\Delta(C \to B)$ and applying it to FileC to synthesize FileB, and extracting the delta file $\Delta(C^{old} \to A)$ and applying it to the earlier version of FileC to synthesize FileA. Due to the internal delta dependency, FileC must be produced before FileB. FileA may be produced at any time independent of the production of the other target files.

Although conventional archives, delta archives, IPD packages and XPD packages are all used in content delivery schemes, they differ in many respects. Some (conventional archives and IPD packages) include all the files needed to produce the target files (i.e. are self-contained), while others (XPD packages and delta archives) do not. Some (IPD packages and XPD packages) have internal delta dependencies, while others (conventional archives and delta archives) have no internal delta dependencies. Moreover, their formats, their authoring tools and the tools for expanding them, are different.

If using a conventional archive or a delta archive, the decision of which files to include in the archive for a given set of target files is trivial. If using an IPD package or an XPD package, the task of determining which delta files to create and which files to include in the package for a given set of target files is not trivial. U.S. Patent Application Publication No. US 2005/0022175 describes a method for determining which delta files to create in order to obtain the smallest IPD package.

When determining which content delivery solution to use, the content provider's options are limited by the content delivery scheme authoring and expansion tools that are available, the computational resources available to the content provider and the consumer, bandwidth and time-to-deploy considerations for the delivery of the files, and the restrictions of the particular archive or package format chosen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A collection of one of more files for delivery to a consumer's computer can be represented as a single file, called a container. A single unified framework is presented that is sufficiently flexible to represent diverse types of containers, including those that contain deltas to produce one or more of the desired target files. Some of these containers are currently represented in distinct fixed formats and authored by distinct authoring mechanisms. This unified framework is also sufficiently flexible to enable the representation, creation and expansion of containers that have no current counterpart. Therefore, it is possible to achieve containers whose measure according to heuristics and/or various cost functions was previously unattainable. For example, it may be possible to achieve smaller containers than before, while retaining the ability to produce the same set of target files from the containers.

An index is used to represent the container and to provide meta-data on the content delivery solutions associated with the container. This meta-data may be used to enhance the experience of delivering the container to the consumer. If more than one content delivery solution is associated with the container, this meta-data may be used by an expansion mechanism at the consumer's computer in order to determine which content delivery solution to implement and therefore which subset of data to extract, or download, from the container to produce the desired set of target files.

BRIEF DESCRIPTION OF THE DRAWINGS AND APPENDIX

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

A container as used herein is a collection of one or more files that is represented as a single file. Conventional archives, delta archives, IPD packages and XPD packages are all examples of containers. Although there are significant differences among conventional archives, delta archives, IPD packages and XPD packages, what they all have in common is that once the container is created, it is associated with a single content delivery solution. Such containers are denoted herein as static. The following table summarizes the categorization of static containers and lists previously-known content delivery schemes that fit in each category:

TABLE 1

Static Containers

| | self-contained | not self-contained |
|---|---|---|
| no internal delta dependencies | conventional archive (WinZip, CAB, TAR, GZIP, bzip2, RAR, JAR, CAB, etc.) | delta archive |
| one or more internal delta dependencies | IPD package | XPD package |

Figure 1:
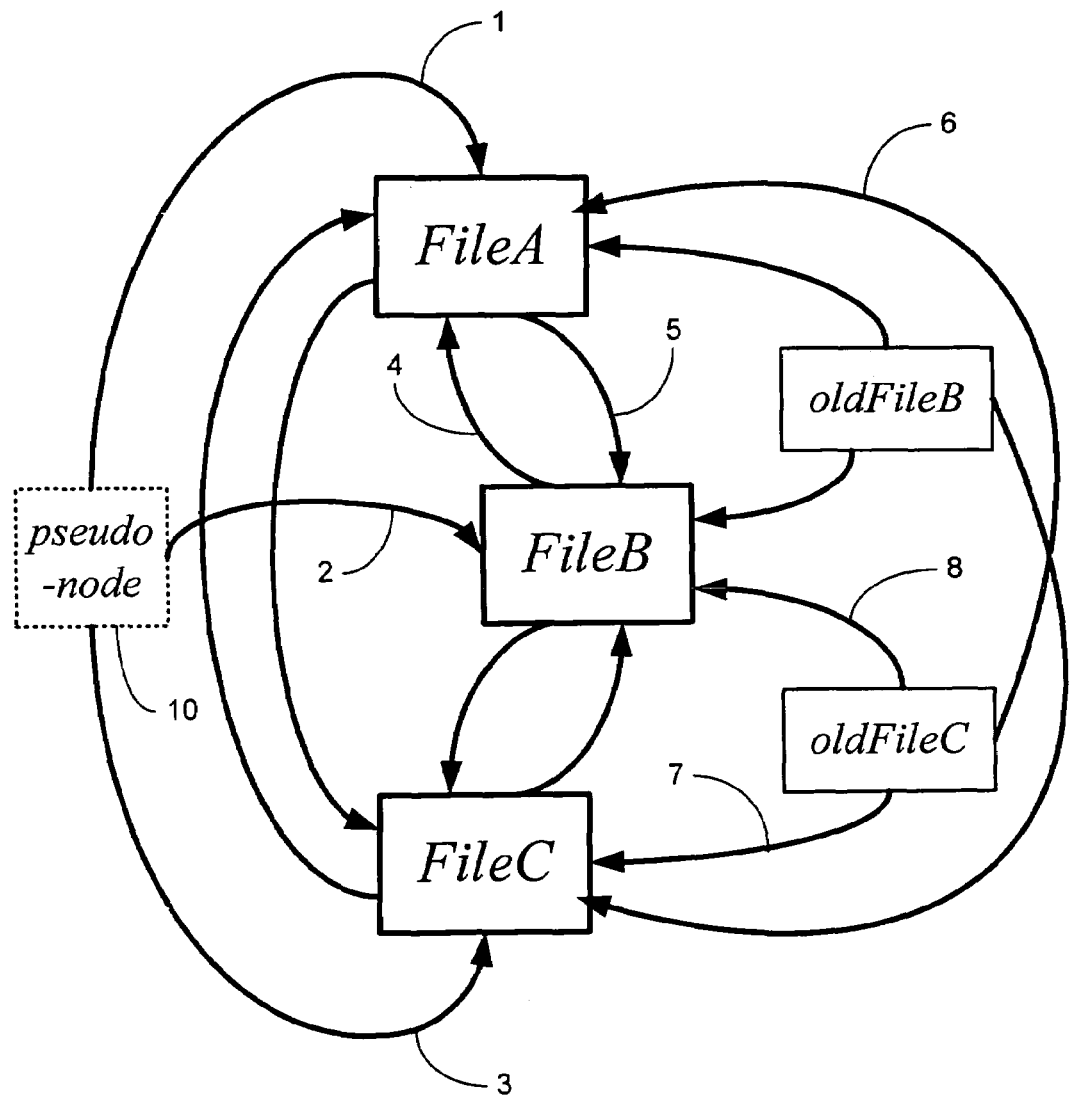
FIG. 1 is an exemplary directed graph that illustrates different content delivery solutions that are possible for three target files.

Many different content delivery solutions are possible when delta files are involved. Consider the example of three target files FileA, FileB and FileC, where one can assume that earlier versions of FileB and FileC (named oldFileB and oldFileC, respectively) are accessible by the consumer's computer. FIG. 1 is a directed graph that illustrates the many different content delivery solutions that are possible. The target files are nodes in the graph. A pseudo-node 10 represents no previously existing file (or an empty file). Arcs 1, 2 and 3 for FileA, FileB and FileC respectively, start at pseudo-node 10 and represent producing a target file from a copy (possibly compressed) of the target file. Arc 4 represents producing FileA by applying to FileB a delta file $\Delta(B \rightarrow A)$ that encodes how FileA differs from FileB. Likewise, arc 5 represents producing FileB by applying to FileA a delta file $\Delta(A \rightarrow B)$ that encodes how FileB differs from FileA. Arc 6 represents producing FileA by applying to oldFileC a delta file $\Delta(C^{old} \rightarrow A)$ that encodes how FileA differs from the earlier version of FileC.

A content delivery solution comprises a set of arcs (without circular dependencies) terminating at the nodes of each of the three target files. Since five arcs end at each of the three nodes, there are many different ways to create the set of target files, that is, many different possible content delivery solutions.

The decision of what to put into a static container and how to produce the target files therefrom is made by the content provider. The static container is then delivered in its entirety to the consumer's computer and expanded to produce the target files at the consumer's computer. If the container is self-contained, as is the case with conventional archives and IPD packages, then the target files can be produced from the container independent of the existing files available to the consumer's computer at the time of expansion. If production of one or more of the target files from the container relies upon the assumption that particular files are accessible by the consumer's computer at the time of expansion, as is the case with delta archives and XPD packages, then the synthesis of those target files will fail if the expansion mechanism cannot find or access one or more of the particular files.

Different content delivery solutions that produce the same set of target files may be compared using heuristics and/or various cost functions. The cost functions may be based on one or more factors such as: the size of the files delivered, the computational resources to compress the files being delivered, bandwidth utilization, the time to implement the solution, the computational resources required to produce the target files at the consumer's computer, and the computational resources to determine the solution.

The directed graph may be augmented with additional information that aids in the selection of the content delivery solution. For example, if the selection of a particular content delivery solution is based on the size of the files to be included in the container, then each arc may be characterized by the size of the file that it represents. If circular references are possible in the directed graph, a directed minimum spanning tree (MST) calculation may be used to select a single content delivery solution according to a particular cost function. Different algorithms for MST calculations are known, and an example algorithm is described in H. Gabow, Z. Galil, T. Spencer and R. E. Tarjan, *Efficient algorithms for finding minimum spanning trees in undirected and directed graphs*, Combinatorica 6:2 (1986), pp. 109-122.

Any other suitable method may also be used to select the single content delivery solution. For example, on the assumption that similar files will yield smaller delta files, the size of a delta file generated from two files can be guessed based on their similarity. For a particular target file, one file may be determined as most similar and the content delivery solution may involve a delta file that encodes how the particular target file differs from its most similar file. Alternatively, for each of N target files, K other target files may be determined as sufficiently similar, and delta files encoding how the one target file differs from another target file may be generated. A directed graph of N nodes and K arcs, augmented with the sizes of the generated delta files, may be constructed. If circular references are possible in the directed graph, a directed MST calculation to select a single content delivery solution according to a particular cost function involving the sizes of the delta files can be performed. Any suitable file similarity algorithm may be used. One example is to compare the hash values of overlapping chunks of one file with those of another file. The more hash values that match, the more similar the two files are considered to be.

Figure 2:
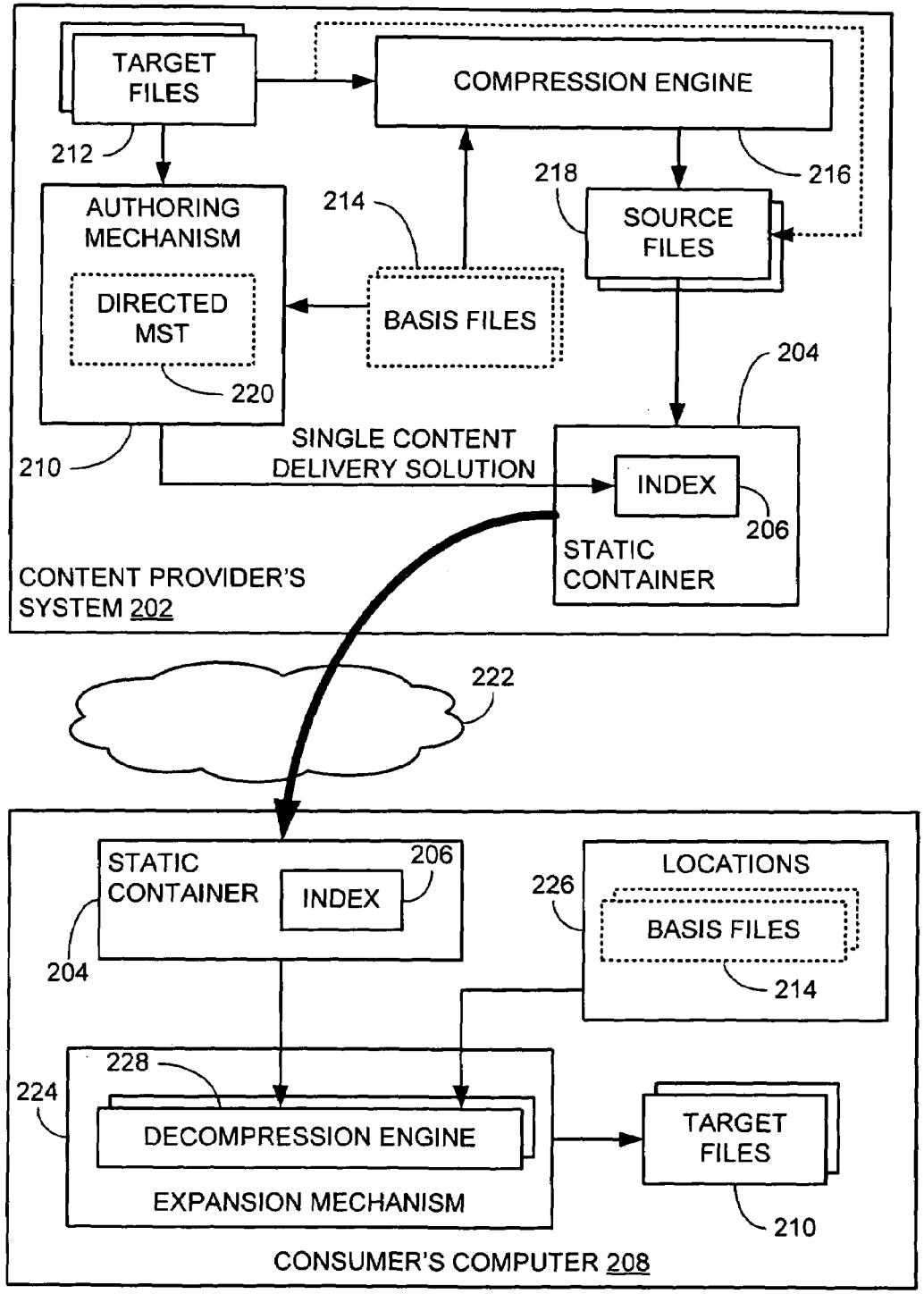
FIG. 2 is a block diagram of a system for authoring, delivering and expanding a static container.

FIG. 2 is a block diagram of a system for authoring, delivering and expanding a static container. The system includes a computing environment 202 of the content provider on which a static container 204 and its index 206 is authored, and a consumer's computer 208 on which the static container is expanded. An authoring mechanism 210 on computing environment 202 receives as input the target files 212 to be produced by the content delivery scheme, along with any basis files 214 that are assumed to be accessible by consumer's computer 208 at the time of expanding container 204. Authoring mechanism 210 selects a single content delivery solution, which is encoded in index 206. The selected content delivery solution may be the optimal solution in view of various constraints, heuristics and/or cost functions.

As will be explained in more detail below, index 206 fully describes the contents of static container 204. Consequently, it is possible that the company, organization or other entity that produces the target files will have an index authored externally and will generate a static container in accordance with the index. The authoring service provider will determine the single content delivery solution to be described in the index based on information received from the producer of the target files. This may be the case, for example, where the authoring service provider has greater computing resources at its disposal than the producer of the target files.

If the selected content delivery solution involves data compression, target files 212 are provided as input to a compression engine 216, along with basis files 214. The output of compression engine 216 is one or more source files 218, which are then included in container 206. Compression engine 216 may use any combination of compression algorithms, including differential compression algorithms. If a differential compression algorithm is used with an empty file (pseudo-node) for the basis file, the resulting source file is simply a compressed version of the target file. The empty file is always available to the corresponding decompression engine. As indicated by the dotted path, uncompressed copies of one or more target files may be included in container 206.

Compression engine 216 may be part of authoring mechanism 210. Authoring mechanism 210 may select the single content delivery solution in any manner. For example, if all or a subset of the possible content delivery solutions are represented as a directed graph, authoring mechanism 210 may include a directed MST module 220.

The single content delivery solution includes the delivery of static container 204 in its entirety to consumer's computer 208. FIG. 2 shows container 204 being downloaded to consumer's computer 208 from content provider's computing environment 202, however it is understood that they may be downloaded to consumer's computer 208 from any other computer that hosts static container 204 including for example, a computer on a corporate network, a computer hosted by an intermediary such as a third party distributor, and so forth. It is also understood that a distributed mechanism, such as typical Internet file sharing, may be used. In that case, portions of static container 204 are spread over multiple computers. As explained hereinbelow, index 206 may be downloaded to consumer's computer 208 in advance of container 204. FIG. 2 shows container 204 being delivered to consumer's computer 208 via a network 222, however it is understood that it may be delivered by other means including, for example, physical means such as a diskette, CD or other physical media.

Container 204 may also include other components, for example, an expansion mechanism, an installation program, and the like.

At consumer's computer 208, an expansion mechanism 224 reads index 206 in order to determine how to produce target files 210 on consumer's computer 208. If container 204 is not self-contained, then at least one of the target files is generated by having a decompression engine 228 apply a delta file included in container 204 to a basis file 214. Basis file 214 is searched for in one or more locations 226 (specified in index 206) that are accessible by consumer's computer 208. Locations 226 may include directories of consumer's computer 208, as well as locations in other file storage systems that are accessible by computer 208, for example, mounted directories, shared directories and trusted computers on a network connected to computer 208. Expansion mechanism 224 may search for the basis files, or the program that calls expansion mechanism 224 to expand container 204 may search for the basis files and provide those that are found to expansion mechanism 224. Decompression engine 228 is also able to decompress any compressed source files 218 that are not delta files. In other implementations, the search locations may not be specified in the index. The expansion mechanism, or the program that calls the expansion mechanism, may have other means to determine where to search.

Returning to FIG. 1, it may be that the single content delivery solution selected by authoring mechanism 210 is to create a container that includes a compressed copy of FileA (arc 4), a delta file $\Delta(C^{old} \rightarrow C)$ that encodes how FileC differs from its earlier version (arc 7), and a delta file $\Delta(C^{old} \rightarrow B)$ that encodes how FileB differs from the earlier version of FileC (arc 8). The solution includes extracting and decompressing the compressed copy of FileA, extracting the delta file $\Delta(C^{old} \rightarrow C)$ and applying it to the earlier version of FileC to synthesize FileC, and extracting the delta file $\Delta(C^{old} \rightarrow B)$ and applying it to the earlier version of FileC to synthesize FileB. Note that although it is assumed that an earlier version of FileB is accessible by the consumer's computer, this earlier version is not part of the selected solution in this example.

This particular content delivery solution may have a measure according to heuristics and/or various cost functions that is preferable to the measure of solutions attainable using previously-known content delivery schemes.

This container clearly belongs in the upper right quadrant of Table 1. It is not self-contained, but it differs from a delta archive in that it includes a compressed copy of one of the target files and one of the delta files is applied to a basis file that is not an earlier version of the target file.

According to an embodiment of the invention, a single unified framework is sufficiently flexible to represent diverse types of containers that are currently represented in distinct fixed formats and authored by distinct authoring mechanisms. The restrictions inherent in some of the existing content delivery schemes are simply not imposed by this unified framework. Consequently, this unified framework enables the representation, creation and expansion of containers that have no current counterpart. Therefore, it may be possible to achieve content delivery solutions whose measure according to heuristics and/or various cost functions was previously unattainable.

There is another class of containers that can be represented by the unified framework. These containers, denoted herein as dynamic, are associated with more than one content delivery solution. The container is created by the content provider but is generally not delivered in its entirety to the consumer's computer. Typically, the container is hosted on a network server and selected files are downloaded to the consumer's computer by retrieving a range of bytes from the container, where the byte range boundaries for each file are specified, either in the container or elsewhere. A dynamic container provides more versatility than a static container, in that a static container that is not self-contained requires a particular set of files to be accessible at the consumer's computer, whereas a dynamic container enables the production of the target files on different computers having different sets of files accessible thereto.

A patch storage file (PSF) is an example of a dynamic container. A PSF is a concatenated collection of smaller files, with some metatdata at the beginning, that supports random access. Typically, a PSF is used to update an operating system. Initially, a package containing only an installation program and installation instructions is downloaded to the consumer's computer. The installation program takes inventory of the existing files on the consumer's computer that can be used as basis files, and then selectively downloads the set of delta files necessary to produce the target files required for the installation. The set of delta files required is dependent on the configuration of the consumer's computer, so different consumer's computers often download different combinations of delta files in order to produce the same set of target files.

In addition to delta files from any number of older, previously released versions of the target files, the PSF also contains compressed copies of the entire target files. If a given consumer's computer does not have a basis file that matches any of the delta files offered to produce one of the target files, a compressed copy of the entire target file is downloaded instead of a delta file. This provides a seamless, fault-tolerant mechanism to ensure that all of the target files can be produced on the consumer's computer regardless of its existing configuration. Because each PSF contains all of the compressed target files and many delta files for some target files, patch storage files are often quite large. However, because each individual installation downloads only the required combination of delta files necessary for that consumer's computer, each installation will download only a small fraction of the entire contents of a patch storage file. Security updates over "WINDOWS®" Update and "MICROSOFT®" Update generally make use of patch storage files.

The following table summarizes the categorization of dynamic containers and lists previously-known content delivery schemes that fit in each category:

TABLE 2

| | Dynamic Containers | |
|---|---|---|
| | self-contained | not self-contained |
| no internal delta dependencies | | PSF |
| one or more internal delta dependencies | | |

Table 2 is quite empty! The left half of Table 2 is empty because a dynamic container that is self-contained would have superfluous files. The lower right quadrant of Table 2 is empty because currently there are no dynamic containers with one or more internal delta dependencies that are not self-contained. It is possible, however, that with such containers, one could achieve content delivery solutions whose measure according to heuristics and/or various cost functions was previously unattainable. The unified framework described below is sufficiently flexible to enable the representation, creation and expansion of dynamic containers belonging to all the categories summarized in Table 2.

Figure 3:
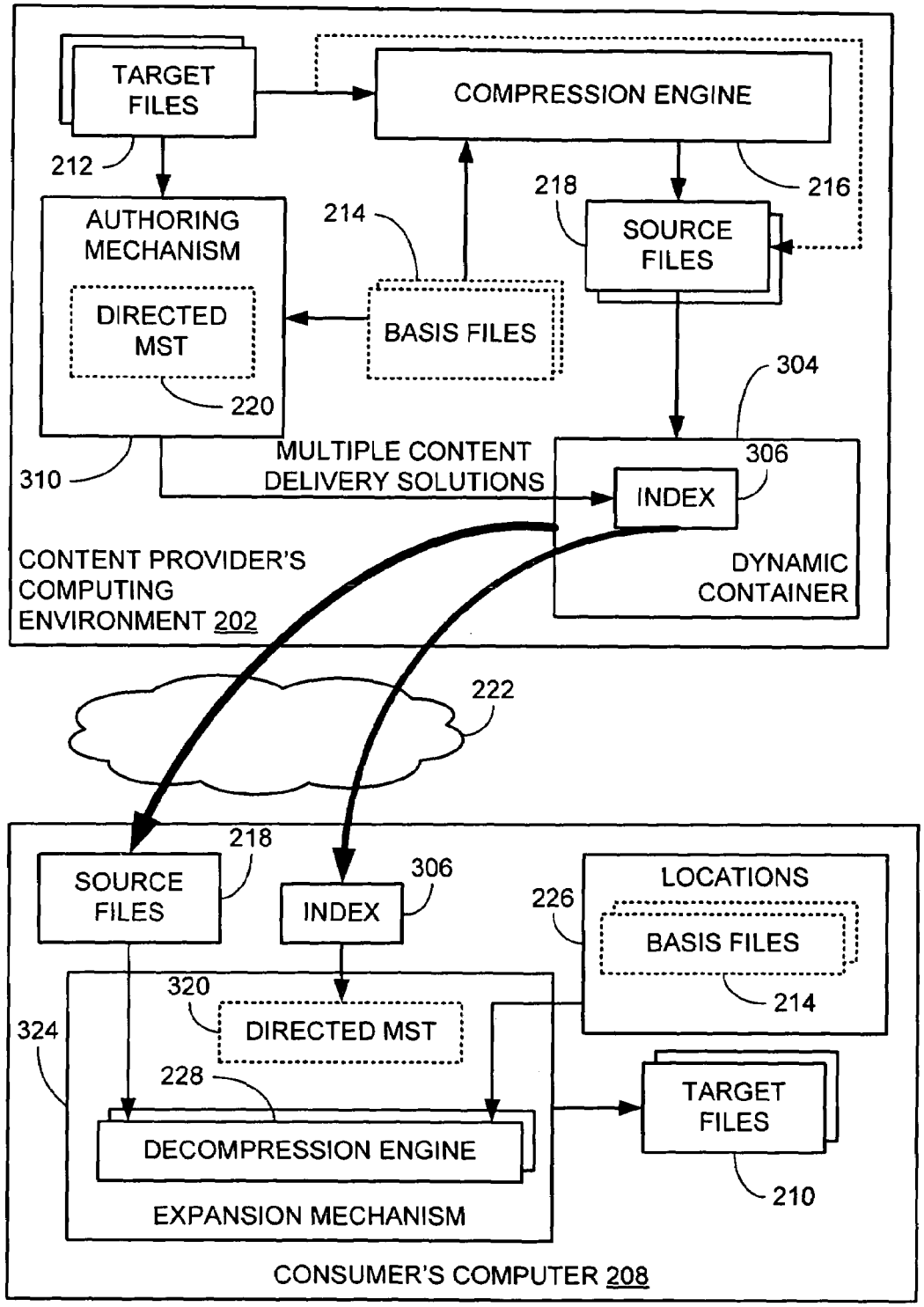
FIG. 3 is a block diagram of a system for authoring, delivering and expanding a dynamic container.

FIG. 3 is a block diagram of a system for authoring, delivering and expanding a dynamic container. This system is similar to that of FIG. 3, and only those aspects which are different are described below. The system includes computing environment 202 of the content provider on which a dynamic container 304 and its index 306 is authored, and consumer's computer 208 on which the target files of the dynamic container are produced. An authoring mechanism 310 on computing environment 202 receives as input the target files 212 to be produced by the content delivery scheme, along with any basis files 214 that are possibly accessible by consumer's computer 208 at the time of expanding container 304. Authoring mechanism 310 selects multiple single content delivery solutions, which are encoded in index 306.

As will be explained in more detail below, index 306 fully describes the contents of dynamic container 304. Consequently, it is possible that the company, organization or other entity that produces the target files will have an index authored externally and will generate a dynamic container in accordance with the index. The authoring service provider will determine the multiple content delivery solutions to be described in the index based on information received from the producer of the target files. This may be the case, for example, where the authoring service provider has greater computing resources at its disposal than the producer of the target files.

Since the number of possible content delivery solutions grows exponentially with the number of target files and the different possible sets of files accessible by the consumer's computer, authoring mechanism 310 does not necessarily consider every such possible content delivery solution for a given set of target files. Rather, the content provider assumes a large number of possible machine states, each representing a set of files that is possibly accessible by consumer's computer 208. This large number of possible machine states reduces the set of every possible content delivery solution to a large set of N content delivery solutions. However, in the unified framework, having two or more content delivery solutions encoded in index 306 qualifies container 304 as dynamic.

In the example shown in FIG. 1, the large number of possible machine states may include also states in which other files are assumed to be accessible by the consumer's computer and from which delta files can be created that encode how the target files differ from those other files. However, the large set of N content delivery solutions may be only those shown by the directed graph in FIG. 1.

Index 306 describing these N content delivery solutions is delivered to consumer's computer 208. An expansion mechanism 324 at consumer's computer 208 then conducts an inventory, determining which basis files 214 are actually accessible by consumer's computer 208. Content delivery solutions described in index 306 that involve basis files that are not accessible by consumer's computer 208 are not achievable, because they cannot be implemented at computer 208 in its current machine state. Only M of the content delivery solutions described in index 306 are actually achievable, where M is less than or equal to N. Expansion mechanism 324 then selects one of the achievable content delivery solutions, causes the appropriate source files 218 to be delivered to consumer's computer 208, and produces target files 210 according to the selected content delivery solution. Meta-data in index 306 such as, for example, the sizes of various source files in container 304, may be used by expansion mechanism 324 in selecting one of the achievable content delivery solutions. The selection of one of the M achievable content delivery solutions may result from a calculation to determine an "optimal" solution according to heuristics and/or various cost functions. For example, expansion mechanism 324 may include a directed MST module 320 to select a content delivery solution according to a cost function.

FIG. 3 shows index 306 and selected source files 218 being downloaded to consumer's computer 208 from content provider's computing environment 202, however it is understood that they may be downloaded to consumer's computer 208 from any other computer that hosts index 306 and container 304 including for example, a computer on a corporate network, a computer hosted by an intermediary such as a third party distributor, and so forth.

Computing environment 202 and computer 208 typically include at least some form of computer readable media. Computer readable media can be any available media that can be accessed by computing environment 202 and computer 208. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 202 and computer 208. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 4:
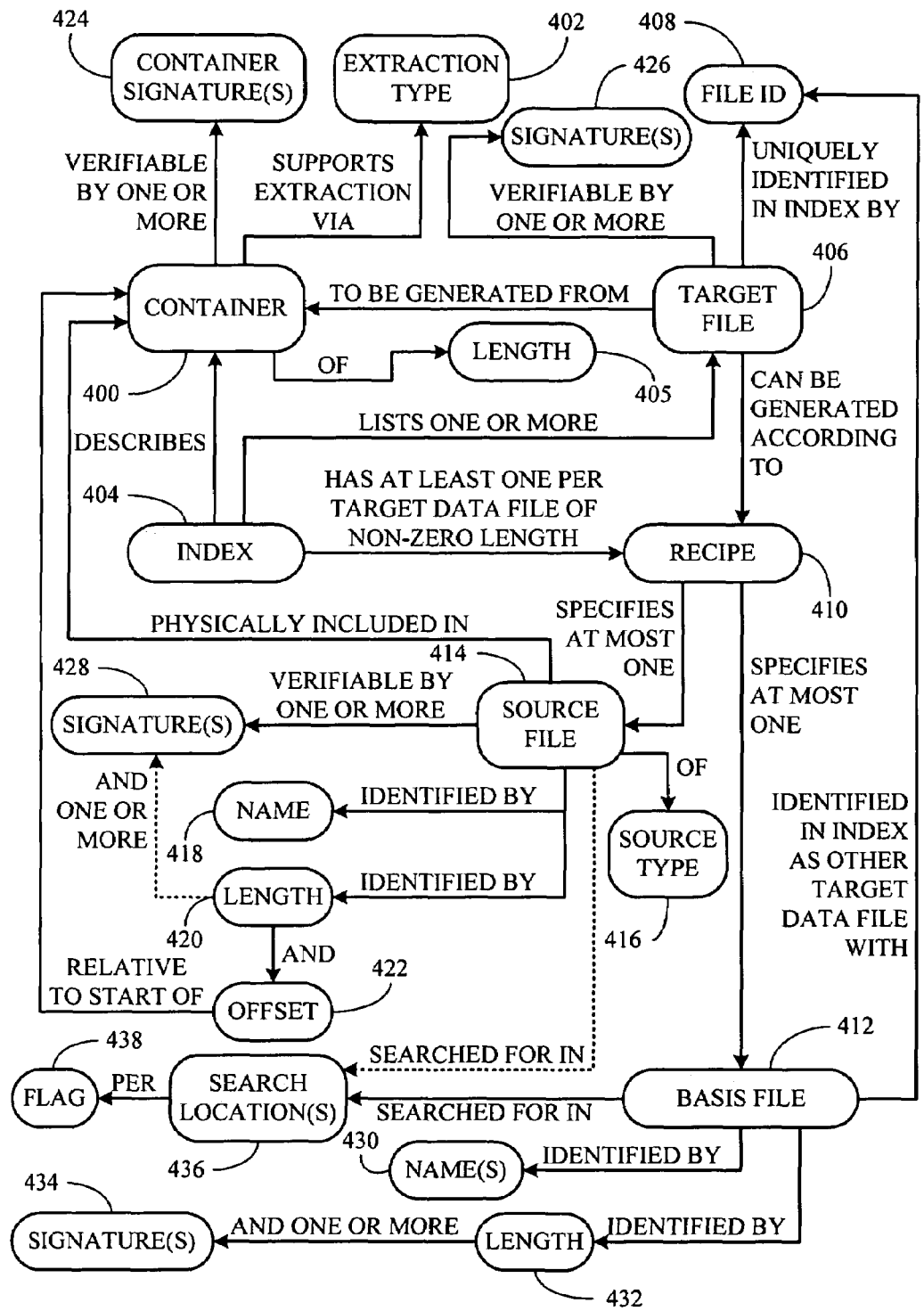
FIG. 4 is an entity-relationship diagram of a unified framework for representing containers.

FIG. 4 is an entity-relationship diagram of the unified framework. A container 400 supports an extraction type 402, such as sequential extraction and random access extraction. For example, the files of a container that supports extraction by read-range are concatenated and are preceded by a special header that demarcates where (i.e. at what range) each file is located within the container. Extraction by read-range involves reading a contiguous range of bytes. In another example, to extract a particular file from a container that supports sequential extraction, all files that precede the particular file in the container must first be extracted.

Container 400 is described by its index 404, which may be included physically in the container. If separate from container 400, index 404 may be downloaded to the consumer's computer in advance of the download of container 400. As explained above, a dynamic container is generally not delivered in its entirety to the consumer's computer. Rather, the index of a dynamic container is downloaded first so that the expansion mechanism at the consumer's computer can determine which files to selectively download to the consumer's computer. In the case of a static container that is downloaded in its entirety, it may still be useful to download the index in advance. If index 404 specifies the length 405 of container 400, this information may be used to enhance the experience of downloading container 400. For example, a download progress bar can indicate how much of container 400 remains.

Index 404 lists any target files 406 to be generated from container 400, identifying each such target file by a unique file ID 408. If container 400 has internal delta dependency, then the order in which the target files are generated is important. In such cases, the expansion mechanism will compute a dependency tree for the target files. If particular target file is to be generated by applying a delta file to another target file, it may be helpful to list the particular target file in index 404 ahead of the other target file, but this is not necessary. Moreover, it should be noted that the content delivery solution for a particular consumer's computer may require only a subset of the target files represented by the container. With static containers, it generally means producing all those target files that, according to the dependency tree, need to be produced in order to produce a dependent target file that is in the desired subset, and then later discarding any of those files that were produced but are not in the desired subset.

For each target file 406 of non-zero length, index 404 specifies at least one recipe 410 for generating the target file. The index of a static container has only one recipe for each target file. The index of a dynamic container has two or more recipes for at least one of the target files.

In general, there are three possible ways to generate a target file of non-zero length on a computer:
 1) copying a single compressed file from the container, or locating the compressed file if accessible by the computer, and decompressing it;
 2) copying a single uncompressed file from the container, or locating the uncompressed file if accessible by the computer; and
 3) applying a delta file (in the container or accessible by the computer) to a basis file (in the container, accessible by the computer, or previously generated as another target file).

For target files of zero length, it is sufficient for the index to specify the name and location of the target file to be generated. A target file of zero length may have additional attributes that are useful, such as its timestamp, or whether it is hidden.

Recipe 410 specifies at most one basis file 412 and at most one source file 414. A source type 416 indicates whether source file 414 is compressed and if so, which compression algorithm was used to create source file 414.

Producing the target file by decompressing a single compressed file is represented by a recipe that specifies a source file created using a specified compression algorithm and does not specify any basis file.

Synthesizing the target file by applying a delta file to a basis file is represented by a recipe that specifies a source file created using a specified differential compression algorithm and also specifies a basis file.

Producing the target file by copying a single uncompressed file is represented by a recipe that specifies a source file that is not compressed and does not specify any basis file, or by a recipe that specifies a basis file and does not specify any source file.

Source files are physically included in the container and are specified in the index in a manner that enables their extraction. For example, if included in a container that supports extraction by name, the source file may be identified in the index by its name 418. In another example, if included in a container that supports extraction by read-range, the source file may be identified in the index by its length 420 and its offset 422 relative to the start of the container.

Index 404 may include one or more signatures 424 for the entire container so that the consumer's computer can verify that the container was received without error. For each target file 406, index 404 may specify one or more signatures 426 so that the consumer's computer can verify that the target file was generated without error. For each source file 414, index 404 may specify one or more signatures 428 so that the consumer's computer can verify that the source file was received without error. If index 404 is itself digitally signed by the content provider, signatures 424, 426 and/or 428 may be used for validation to prove that the container, the target files and/or the source files were indeed published by the content provider and have not been maliciously modified in transit, perhaps by an attacker aiming to plant malware on the consumer's computer. For example, a signature includes the hash value of the file and an indication of the hashing algorithm used to calculate the hash value. The signature may also comprise additional information. A non-exhaustive list of examples of hashing algorithms currently considered sufficiently strong for validation includes SHA1, SHA256, SHA384 and SHA512.

Basis files are not necessarily physically included in the container. If the basis file is another target file (i.e. not the target file in the recipe of which this basis file is specified) that could be generated from the container, the basis file may be identified in the index by the unique file ID of the other target file.

A basis file that might be present on or accessible by the consumer's computer may be identified in index 404 by its name 430, as well as by any other names it might have. For example, the file ntoskrnl.exe may exist on the consumer's computer as ntkrnlmp.exe, which is the multi-processor version of the file. A basis file that might be present on or accessible by the consumer's computer may be identified by its length 432 and by one or more of its signatures 434. In both cases, the basis file will be searched for at the consumer's computer in one or more search locations 436 defined in index 404. A flag 438 may be associated with a search location 436 to specify how the search is performed. For example, if a search location 436 is a directory, its flag 438 may indicate that the directory is to be searched recursively, so that all sub-directories of the directory and their sub-directories (and so on) are also searched. In another example, if a search location 436 is a directory, its flag 438 may indicate that any compressed containers found in this directory are also to be searched.

Since signature 434 is used only to identify basis file 412, it may use a weaker hashing algorithm than those used for validation, for example, CRC32 (cyclic redundancy check—32 bit).

In alternative implementations, a source file 414 may be physically excluded from the container, in which case it may be identified in index 404 by its name 418, or by its length 420 and by one or more of its signatures 428. Such a source file will be searched for at the consumer's computer in the search locations 436.

It will be appreciated that index 404 might include meta-data about the container itself, the target files and the source and basis files. This meta-data includes validation signatures, descriptive text to display to the user during expansion, applicability information, and information such as sizes of source files that can be used by expansion mechanism 324 to select a single content delivery solution.

In alternative implementations, a single index could describe content available from multiple containers, and/or a single container could be variously described in multiple indexes, and/or a single solution could require cross-examination of multiple indexes for one or more containers.

In alternative implementations, differential compression could involve multiple basis files to produce a single target file.

In the following description, the index is implemented as an eXtensible Markup Language (XML) document. An XML Schema defines the correct building blocks of the XML document and is used to validate whether or not an index has all the correct elements in all the correct locations. An exemplary XML Schema is provided in Appendix A. Alternatively, a document type definition (DTD) could be used to define the correct building blocks of the index. Other implementations of the index are also contemplated.

The following section of the description demonstrates that the unified framework is able to represent all the current content delivery schemes listed in Table 1 and Table 2.

Conventional Archives

In the unified framework, this type of container includes only source files and no basis files. Since conventional archives are static, the index of the container has no more than one recipe per target file of non-zero length. Each recipe specifies a single source file and no basis file.

Figure 5:
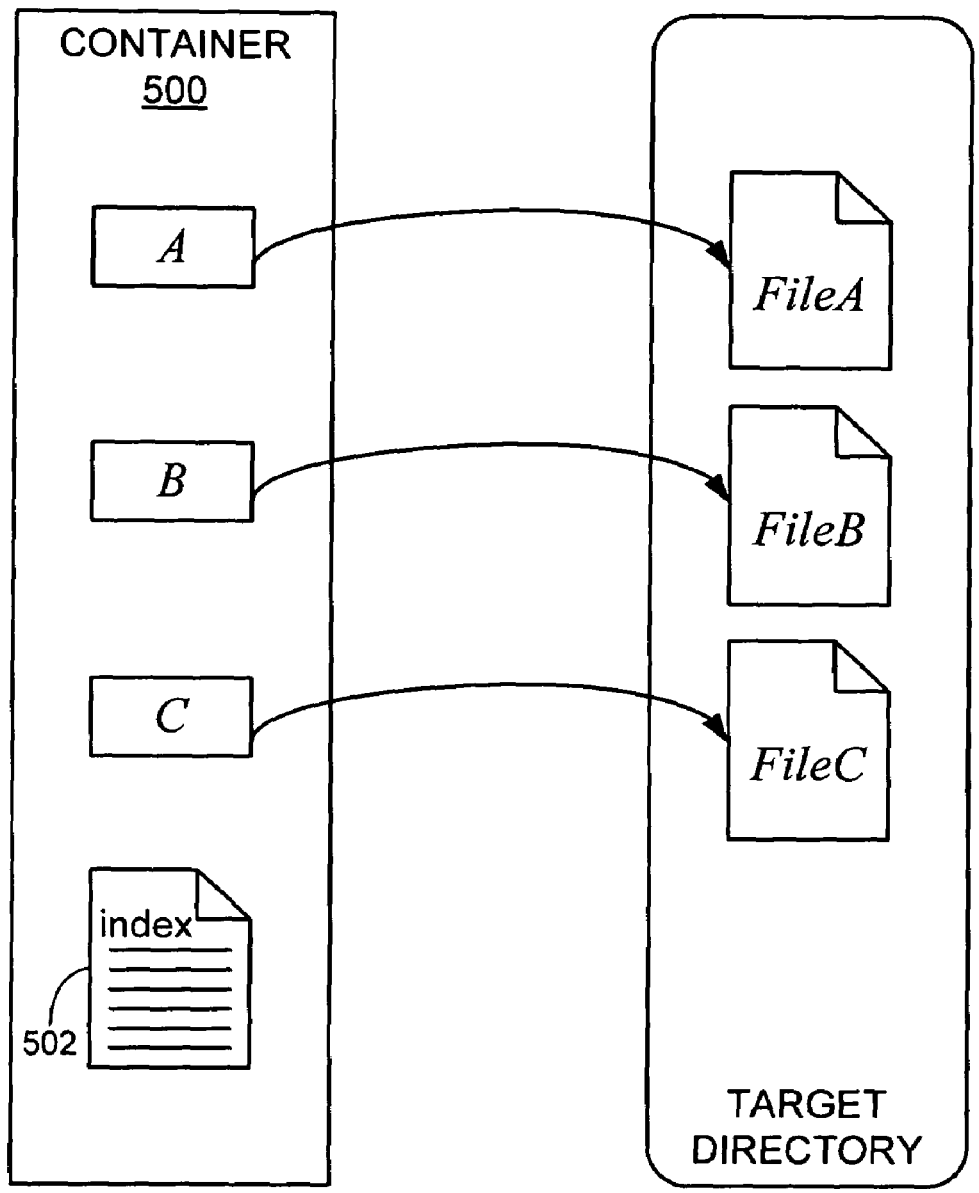
FIG. 5 is a block diagram generally representing extraction of multiple files from a conventional archive.

FIG. 5 is a block diagram generally representing extraction of multiple files from a conventional archive, which is referenced as a container 500. Container 500 is represented by an index 502, a simplified version of which is given by:

```
<Container>
    <Files>
        <File id="1" name="FileA">
            <Recipe>
                <Source type="RAW" name="A" />
            </Recipe>
        </File>
```

-continued

```
        <File id="2" name="FileB">
            <Recipe>
                <Source type="PA19" name="B" />
            </Recipe>
        </File>
        <File id="3" name="FileC">
            <Recipe>
                <Source type="PA19" name="C" />
            </Recipe>
        </File>
    </Files>
</Container>
```

In this example, three target files named FileA, FileB and FileC are to be produced from container 500, which supports extraction by name. Container 500 contains an uncompressed copy of FileA, named A, a compressed copy of FileB, named B, and a compressed copy of FileC, named C.

The only content delivery solution associated with this container is to deliver the container in its entirety to the consumer's computer, to extract A from the container, and to extract and decompress B and C from the container, thus producing FileA, FileB and FileC on the consumer's computer. The string "PA19" specifies the compression algorithm used to create B and C.

Delta Archives

In the unified framework, this type of container includes only source files and no basis files. All of the source files are delta files, although not necessarily using the same differential compression algorithm. Since delta archives are static, the index of the container has one recipe per target file of non-zero length to be generated from the container. All recipes specify a source file and a basis file. The basis file is an earlier version of the target file. The index also specifies one or more locations on the target computer where the extractor is to search for basis files.

Figure 6:
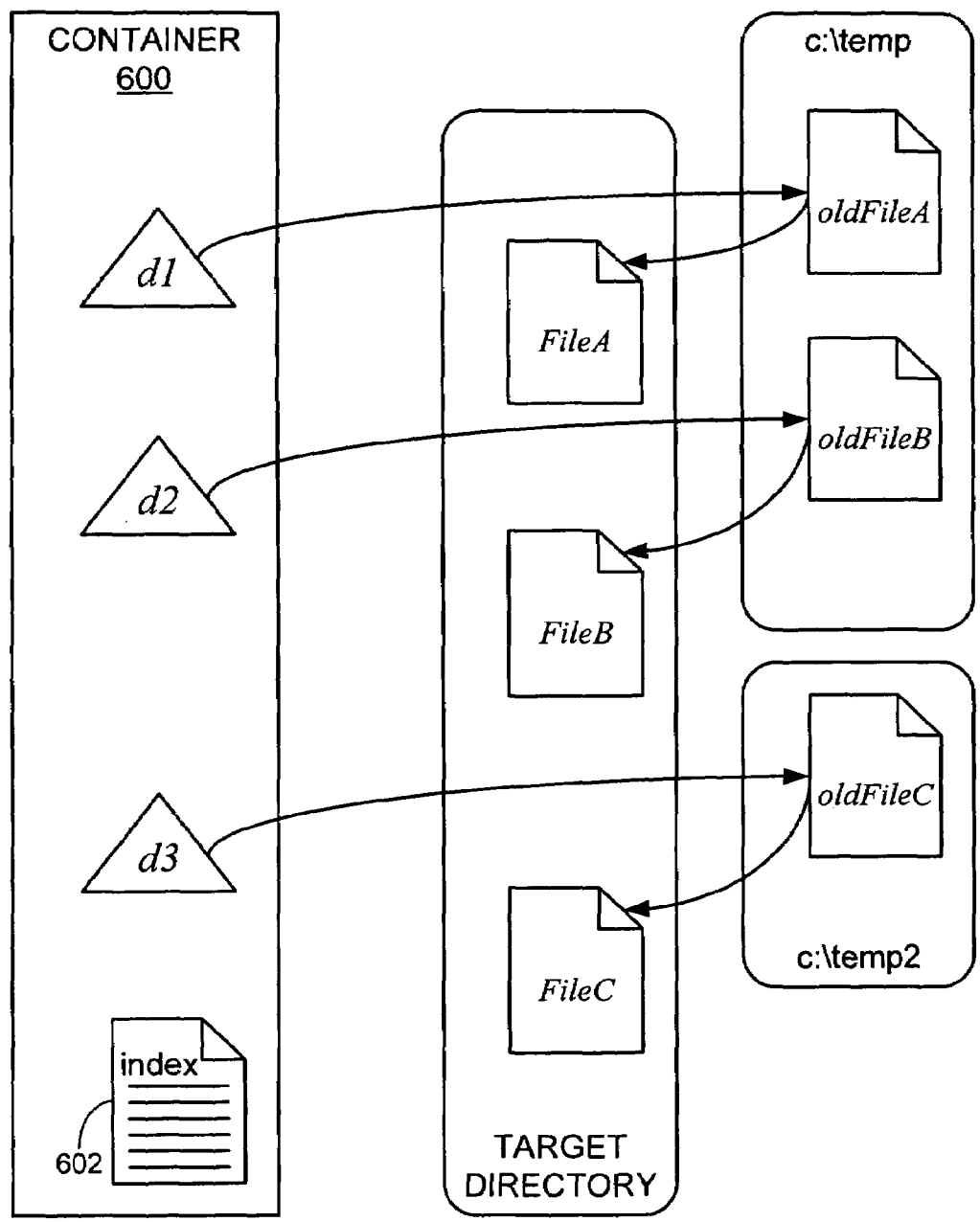
FIG. 6 is a block diagram generally representing extraction of multiple files from a delta archive.

FIG. 6 is a block diagram generally representing extraction of multiple files from a delta archive, which is referenced as a container 600. Container 600 is represented by an index 602, a simplified version of which is given by:

```
<Container>
    <Search>
        <Location id="1" path="c:\temp\oldFileA" />
        <Location id="2" path="c:\temp\oldFileB" />
        <Location id="3" path="c:\temp2\oldFileC" />
    </Search>
    <Files>
        <File id="1" name="FileA">
            <Recipe>
                <Source type="PA30" name="d1" />
                <Basis loc="1" />
            </Recipe>
        </File>
        <File id="2" name="FileB">
            <Recipe>
                <Source type="PA19" name="d2" />
                <Basis loc="2" />
            </Recipe>
        </File>
        <File id="3" name="FileC">
            <Recipe>
                <Source type="PA19" name="d3" />
                <Basis loc="3" />
            </Recipe>
        </File>
    </Files>
</Container>
```

In this example, three target files named FileA, FileB and FileC are to be produced from container 600, which supports extraction by name. Container 600 contains a delta file $\Delta(A^{old} \rightarrow A)$ named d1 that encodes how FileA differs from its earlier version named oldFileA. It also contains a delta file $\Delta(B^{old} \rightarrow B)$ named d2 that encodes how FileB differs from its earlier version named oldFileB. It also contains a delta file $\Delta(C^{old} \rightarrow C)$ named d3 that encodes how FileC differs from its earlier version named oldFileC.

The only content delivery solution associated with this container is to deliver the container in its entirety to the consumer's computer, to extract each delta file from the container, and to apply it to its respective basis file, thus producing FileA, FileB and FileC on the consumer's computer. The string "PA30" specifies the differential compression algorithm used to create d1 and the string "PA19" specifies the differential compression algorithm used to create d2 and d3. If, for example, the expansion mechanism at the consumer's computer is unable to find the basis file oldFileA at the location c:\temp specified in index 602, the expansion mechanism is unable to generate the target file FileA.

Intra-Package Delta (IPD) Package

In the unified framework, this type of container may include source files and basis files. Since an IPD package has internal delta dependency, at least one of the source files is a delta file, and its corresponding basis file is some other target file described in the index. Since IPD packages are static, the index of the container includes no more than one recipe for each target file of non-zero length. No search locations are defined in the index.

Figure 7:
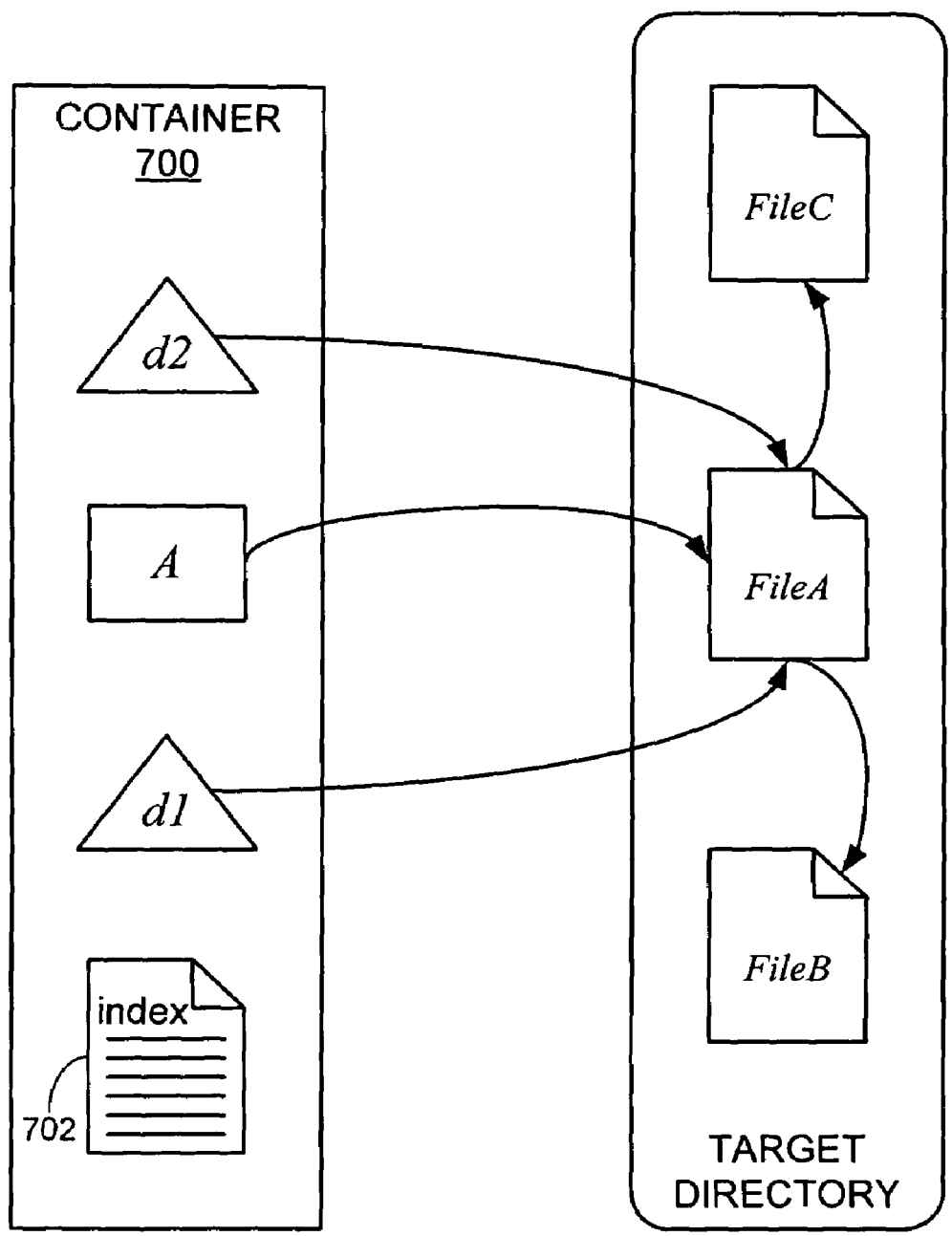
FIG. 7 is a block diagram generally representing extraction of multiple files from an intra-package delta (IPD) package.

FIG. 7 is a block diagram generally representing extraction of multiple files from an IPD package, referenced as a container 700. Container 700 is represented by an index 702, a simplified version of which is given by:

```
<Container>
    <Files>
        <File id="1" name="FileA">
            <Recipe>
                <Source type="PA30" name="A" />
            </Recipe>
        </File>
        <File id="2" name="FileB">
            <Recipe>
                <Source type="PA30" name="d1" />
                <Basis file="1" />
            </Recipe>
        </File>
        <File id="3" name="FileC">
            <Recipe>
                <Source type="PA30" name="d2" />
                <Basis file="1" />
            </Recipe>
        </File>
    </Files>
</Container>
```

In this example, three target files named FileA, FileB and FileC are to be produced from container 700, which supports extraction by name. Container 700 contains a compressed copy of FileA, named A, a delta file $\Delta(A \rightarrow B)$ named d1 that encodes how FileB differs from FileA, and a delta file $\Delta(A \rightarrow C)$ named d2 that encodes how FileC differs from FileA.

The only content delivery solution associated with this container is to deliver the container in its entirety to the consumer's computer, to extract and decompress A from the container to produce FileA, to extract d1 from the container and apply it to FileA to produce FileB, and to extract d2 from the container and apply it to FileA to produce FileC. Since there is an internal delta dependency, FileA must be produced before FileB is produced. Likewise, FileA must be produced before FileC is produced. Although FIG. 7 shows FileB being produced before FileC, it is possible for FileC to be produced before FileB.

Although U.S. Patent Application Publication No. US 2005/0022175 describes a manifest file for the IPD package, this manifest file—currently implemented in an INI format—is not the same as an index since it is not as flexible. For example, the manifest file cannot describe dynamic containers.

Extra-Package Delta (XPD) Package

In the unified framework, this type of container may include source files and basis files. At least one source file is a delta file and its corresponding basis file, which is not included in the container, is not a target file generated from the container. The index of the container includes no more than one recipe for each target file of non-zero length. The index specifies one or more search locations on the target computer where the extractor is to search for basis files.

Figure 8:
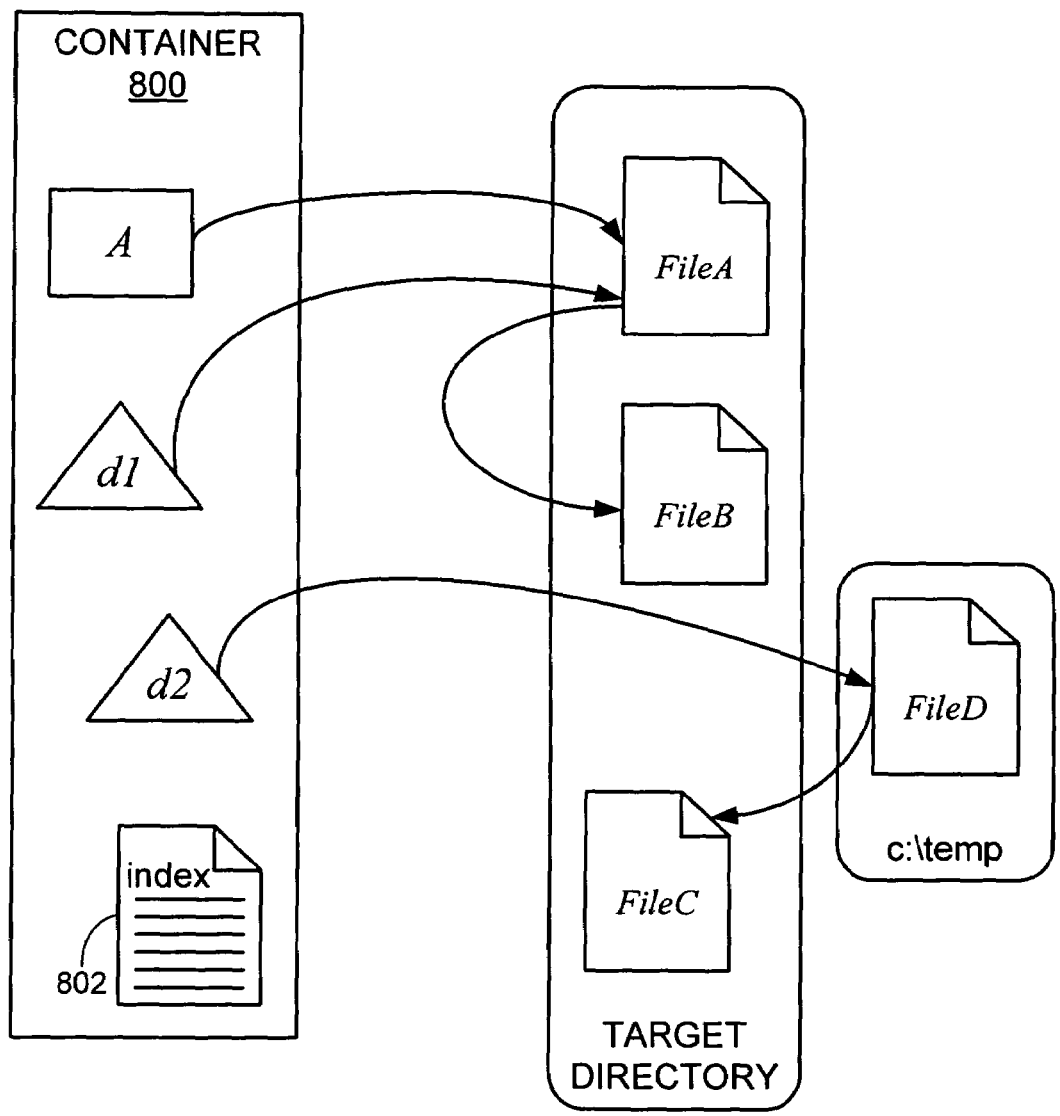
FIG. 8 is a block diagram generally representing extraction of multiple files from an extra-package delta (XPD) package.

FIG. 8 is a block diagram generally representing extraction of multiple files from an XPD package, referenced as a container 800. Container 800 is represented by an index 802, a simplified version of which is given by:

```
<Container>
    <Search>
        <Location id="1" path="c:\temp\FileD" />
    </Search>
    <Files>
        <File id="1" name="FileA">
            <Recipe>
                <Source type="PA30" name="A" />
            </Recipe>
        </File>
        <File id="2" name="FileB">
            <Recipe>
                <Source type="PA30" name="d1" />
                <Basis file="1" />
            </Recipe>
        </File>
        <File id="3" name="FileC">
            <Recipe>
                <Source type="PA30" name="d2" />
                <Basis loc="1" />
            </Recipe>
        </File>
    </Files>
</Container>
```

In this example, three target files named FileA, FileB and FileC are to be generated from container 800, which supports extraction by name. Container 800 contains a compressed copy of FileA, named A, a delta file $\Delta(A \rightarrow B)$ named d1 that encodes how FileB differs from FileA, and a delta file $\Delta(D \rightarrow C)$ named d2 that encodes how FileC differs from FileD.

The only content delivery solution associated with this container is to deliver the container in its entirety to the consumer's computer, to extract and decompress A from the container to produce FileA, to extract d1 from the container and apply it to FileA to produce FileB, and to extract d2 from the container and apply it to FileD to produce FileC. Since there is an internal delta dependency, FileA must be produced before FileB is produced. Since the container is not self-contained, if the expansion mechanism at the consumer's computer is unable to find the basis file FileD at the location c:\temp specified in index 802, the expansion mechanism is unable to generate the target file FileC.

Patch Storage Files

In the unified framework, this type of container includes only source files and no basis files. For each target file of non-zero length to be generated from the container, the index includes a recipe that specifies a single source file that is not a delta file and does not specify a basis file (such as a compressed form of the target file). For some of the target files, where it is expected that some of the target computers have appropriate basis files, the index also includes one or more recipes each of which specifies a single source file that is a delta file and also specifies a corresponding basis file for that delta file. The index specifies one or more search locations on the target computer where the extractor is to search for basis files.

Figure 9:
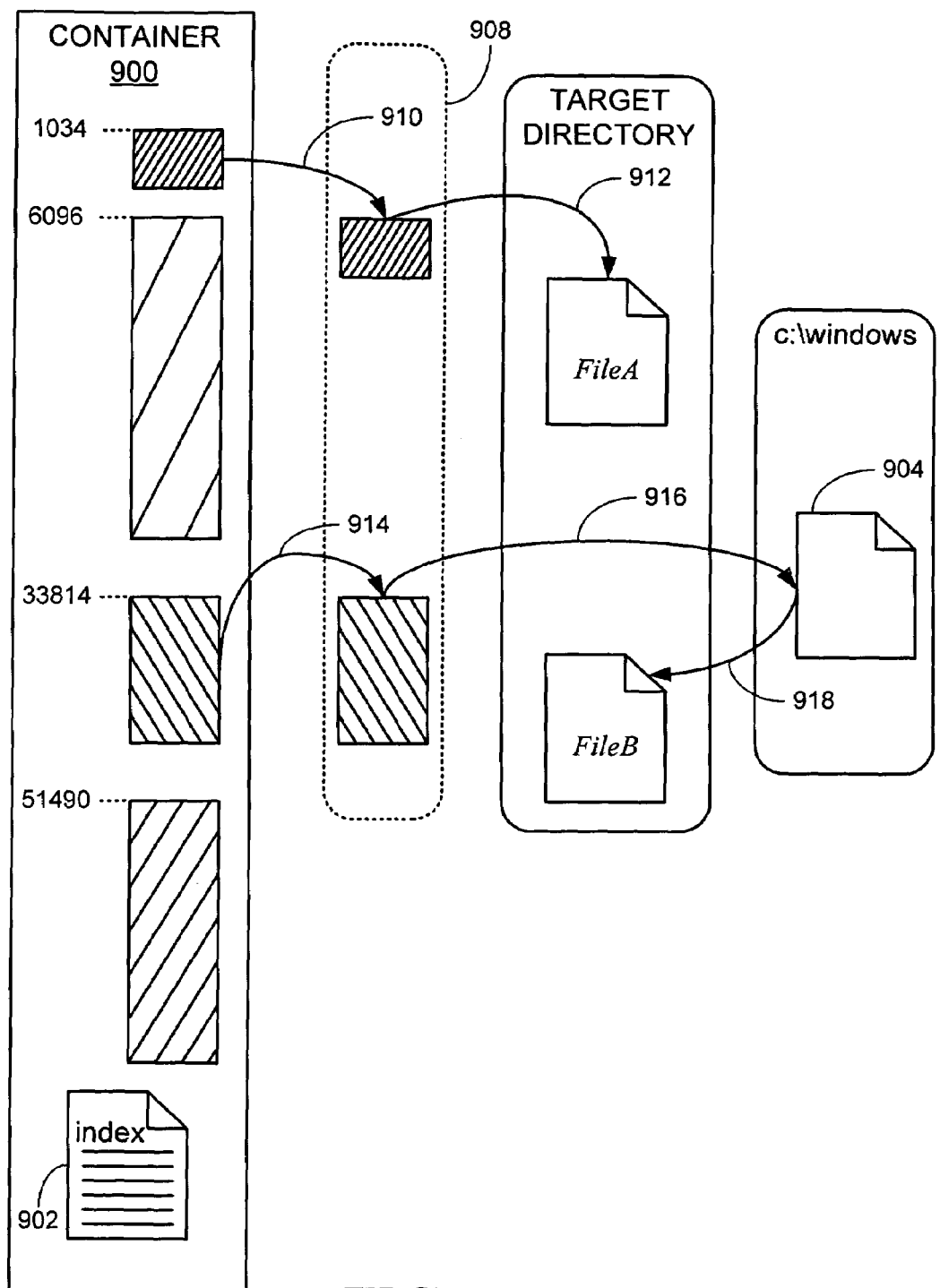
FIG. 9 is a block diagram generally representing extraction of multiple files from a patch storage file.

FIG. 9 is a block diagram generally representing extraction of multiple files from a patch storage file, which is referenced as a container 900. Container 900 is represented by an index 902, a simplified version of which is given by:

```
<Container>
    <Search>
        <Location id="1" path="c:\windows"/>
    </Search>
    <Files>
        <File id="1" name="FileA">
            <Recipe>
                <Source type="PA30" offset="1034"
                    length="125" />
            </Recipe>
        </File>
        <File id="2" name="FileB">
            <Recipe>
                <Source type="PA30" offset="6096"
                    length="22514" />
            </Recipe>
            <Recipe>
                <Source type="PA30" offset="33814"
                    length="6343" />
                <Basis length="51200">
                    <Hash alg="SHA1"
                        value="6d2ce283e4e4re2de93057649c94
                        68fb413c8444" />
                </Basis>
            </Recipe>
            <Recipe>
                <Source type="PA30" offset="51490"
                    length="11517" />
                <Basis length="56832">
                    <Hash alg="SHA1"
                        value="3423bf840a185b8c6c948929eb76
                        ac4a950640e6" />
                </Basis>
            </Recipe>
        </File>
    </Files>
</Container>
```

In this example, two target files named FileA and FileB are to be generated from container 900, which supports extraction by read-range. Container 900 contains various files, some of which are compressed copies of target files and some of which are delta files. Container 900 includes a compressed copy of FileA, which is of length 125 bytes and is found at offset 1024 from the start of the container. Container 900 also includes a compressed copy of FileB, which is of length 22514 bytes and is found at offset 4096 from the start of the container. Container 900 also includes a delta file of length 6343 bytes found at offset 33814 from the start of the container. This delta file encodes how FileB differs from an earlier version of FileB of length 51200 having the hash value "6d2ce283e4e4re2de93057649c9468fb413c8444" when using the SHA1 hashing algorithm. Container 900 also includes a delta file of length 11517 bytes found at offset 51490 from the start of the container. This delta file encodes how FileB differs from an earlier version of FileB of length 56832 having the hash value "3423bf840a185b8c6c948929eb76ac4a950640e6" when using the SHA1 hashing algorithm.

Three different content delivery solutions are associated with this container. Index 902 is delivered to the consumer's computer, where the expansion mechanism performs an inventory to determine which, if any, of the basis files specified in index 902 are accessible by the consumer's computer. In this particular example, the expansion mechanism looks in the c:\windows directory on the consumer's computer for the basis files. If, for example, the expansion mechanism finds in the c:\windows directory a file 904 (an earlier version of FileB) that is of length 51200 and has the hash value "6d2ce283e4e4re2de93057649c9468fb413c8444" when using the SHA1 hashing algorithm, then the expansion mechanism may determine that the second recipe for FileB is to be followed, because it involves a smaller source file than the first recipe for FileB and a smaller source file than the third recipe for FileB. As indicated by the numbered arrows, the expansion mechanism will download (as indicated by arrow 910) the compressed copy of FileA to a temporary location 908 on the consumer's computer and decompress it (as indicated by arrow 912) to produce FileA. The expansion mechanism will then download (as indicated by arrow 914) to location 908 the delta file of length 6343 bytes found at offset 33814 from the start of the container and apply (as indicated by arrow 916) this delta file to basis file 904 to synthesize (as indicated by arrow 918) FileB.

The following section of the description demonstrates that the unified framework is able to represent all the content delivery schemes that have no current counterpart and yet can be categorized in either Table 1 or Table 2.

In the case of static containers, authoring mechanism 210 of FIG. 2 is not limited by the restrictions of current content delivery schemes. Authoring mechanism 210 may select a content delivery solution that represents a container that has no current counterpart and a measure of which according to heuristics and/or various cost functions was previously unattainable.

In the case of dynamic containers, previously-known expansion mechanisms conduct an inventory to determine which files to download from a PSF. For a given target file to be produced from a PSF, the basis files are different versions of the same file. If more than one version is present on the consumer's computer, the expansion mechanism chooses the smallest delta file in the PSF to produce the given target file from a version of the same file on the consumer's computer.

Since authoring mechanism 310 of FIG. 3 is not limited by the restrictions of patch storage files, it can create dynamic containers with internal delta-dependencies and/or with delta files generated using basis files that are not earlier versions of the target files. The inventory conducted by expansion mechanism 324 may result in more than one achievable content delivery solution, and expansion mechanism 324 may therefore be able to select a content delivery solution a measure of which according to heuristics and/or various cost functions was previously unattainable.

Other Static Containers

Figure 10:
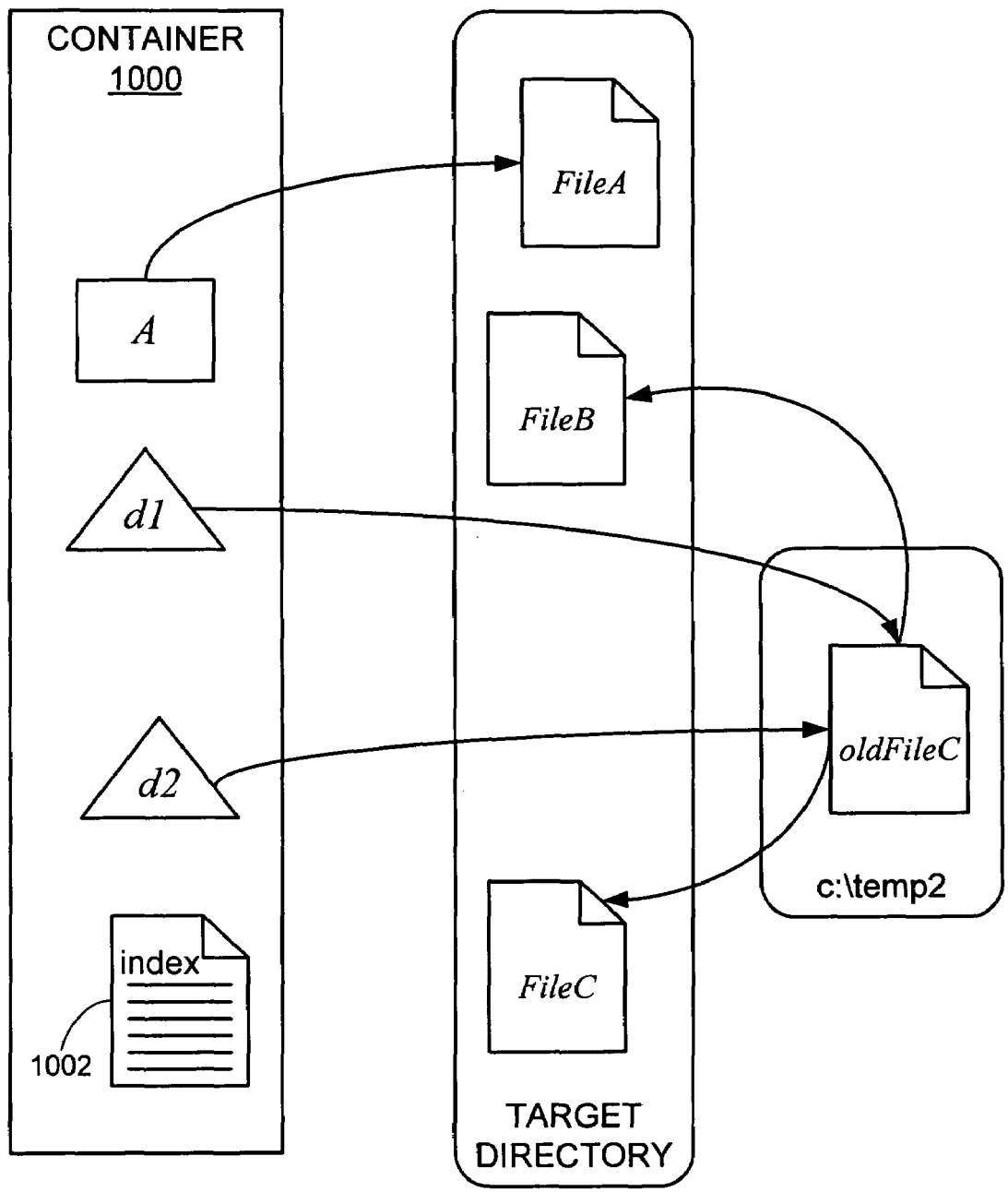
FIG. 10 is a block diagram generally representing extraction of multiple files from an exemplary static container that is not-self contained and has no internal delta dependencies.

FIG. 10 is a block diagram generally representing extraction of multiple files from an exemplary static container that is not self-contained and has no internal delta dependencies.

The content delivery solution encoded in this container is the solution described above as belonging to the lower left quadrant of Table 1.

A container 1000 includes one non-delta source file and two delta source files. Container 1000 is represented by an index 1002, a simplified version of which is given by:

```
<Container>
    <Search>
        <Location id="1" path="c:\temp2\oldFileC" />
    </Search>
    <Files>
        <File id="1" name="FileA">
            <Recipe>
                <Source type="PA30" name="A" />
            </Recipe>
        </File>
        <File id="2" name="FileB">
            <Recipe>
                <Source type="PA19" name="d1" />
                <Basis loc="1" />
            </Recipe>
        </File>
        <File id="3" name="FileC">
            <Recipe>
                <Source type="PA19" name="d2" />
                <Basis loc="1" />
            </Recipe>
        </File>
    </Files>
</Container>
```

In this example, three target files named FileA, FileB and FileC are to be generated from container 1000, which supports extraction by name. Container 1000 contains a compressed copy of FileA, named A, a delta file $\Delta(C^{old} \rightarrow B)$ named d1 that encodes how FileB differs from an earlier version of FileC, and a delta file $\Delta(C^{old} \rightarrow C)$ named d2 that encodes how FileC differs from its earlier version.

The only content delivery solution associated with this container is to deliver the container in its entirety to the consumer's computer, to extract and decompress A from the container to produce FileA, to extract d1 from the container and apply it to oldFileC to produce FileB, and to extract d2 from the container and apply it to oldFileC to produce FileC. Since the container is not self-contained, if the expansion mechanism at the consumer's computer is unable to find the basis file oldFileC at the location c:\temp2 specified in index 1002, the expansion mechanism is unable to generate the target files FileB and FileC.

Other Dynamic Containers

Figure 11:
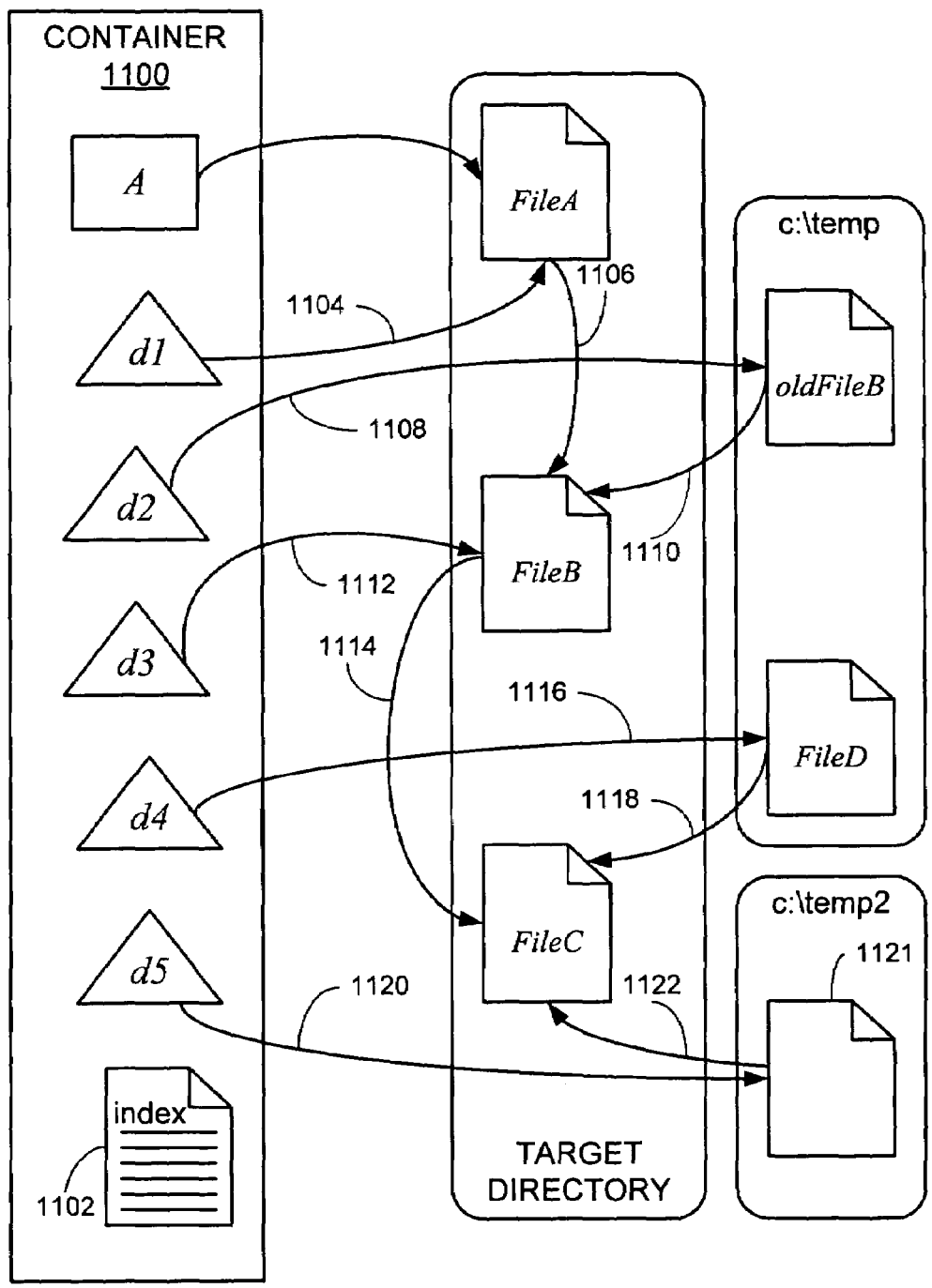
FIG. 11 is a block diagram generally representing extraction of multiple files from an exemplary dynamic container with internal delta dependencies; and Appendix A is an example XML schema for an XML-based index of a container.

FIG. 11 is a block diagram generally representing extraction of multiple files from an exemplary dynamic container with internal delta-dependencies, which is referenced as a container 1100. Container 1100 is represented by an index 1102, a simplified version of which is given by:

```
<Container>
    <Search>
        <Location id="1" path="c:\temp\oldFileB" />
        <Location id="2" path="c:\temp\FileD" />
        <Location id="3" path="c:\temp2\" />
    </Search>
    <Files>
        <File id="1" name="FileA">
            <Recipe>
                <Source type="PA30" name="A" />
            </Recipe>
        </File>
```
-continued
```
        <File id="2" name="FileB">
            <Recipe>
                <Source type="PA19" name="d1" />
                <Basis file="1" />
            </Recipe>
            <Recipe>
                <Source type="PA19" name="d2" />
                <Basis loc="1" />
            </Recipe>
        </File>
        <File id="3" name="FileC">
            <Recipe>
                <Source type="PA19" name="d3" />
                <Basis file="2" />
            </Recipe>
            <Recipe>
                <Source type="PA30" name="d4" />
                <Basis loc="2" />
            </Recipe>
            <Recipe>
                <Source type="PA19" name="d5" />
                <Basis loc="3">
                    <Hash alg="SHA1"
                        value="1423bf840a765b8c6c914029ab76ac4a43064be6"
                    />
                </Basis>
            </Recipe>
        </File>
    </Files>
</Container>
```

In this example, three target files named FileA, FileB and FileC are to be generated from container 1100, which supports extraction by name. Container 1100 contains a compressed copy of FileA, named A, a delta file $\Delta(A \rightarrow B)$ named d1 that encodes how FileB differs from FileA, a delta file $\Delta(B^{old} \rightarrow B)$ named d2 that encodes how FileB differs from its earlier version, a delta file $\Delta(B \rightarrow C)$ named d3 that encodes how FileC differs from FileB, a delta file $\Delta(D \rightarrow C)$ named d4 that encodes how FileC differs from a FileD, and a delta file named d5 that encodes how FileC differs from a file having the hash value "1423bf840a765b8c6c914029ab76 ac4a43064be6" when using the SHA1 hashing algorithm.

There are two recipes in index 1102 for FileB; one is indicated in FIG. 11 by arrows 1104 and 1106, and another by arrows 1108 and 1110. There are three recipes in index 1102 for FileC; one is indicated by arrows 1112 and 1114, another by arrows 1116 and 1118, and another by arrows 1120 and 1122. Consequently, many different content delivery solutions are associated with container 1100.

Index 1102 is delivered to the consumer's computer, where the expansion mechanism performs an inventory to determine which, if any, of the basis files specified in index 1102 are accessible by the consumer's computer. In this particular example, the expansion mechanism looks in the c:\temp directory for files named oldFileB and FileD, and in the c:\temp2 directory for a file having the hash value "1423bf840a765b8c6c914029ab76 ac4a43064be6" when using the SHA1 hashing algorithm. If the results of the inventory are such that two or more of the content delivery solutions are achievable, then the expansion mechanism will have to select a single content delivery solution to implement. This selection may be made, for example, according to heuristics and/or various cost functions.

If, for example, the selected content delivery solution is the one that uses the first recipe for FileB and the second recipe for FileC, then the source files A, d1 and d4 will be downloaded to the consumer's computer, and the source files d2, d3 and d5 will not be downloaded. Source file A will be decompressed to produce FileA, d1 will be applied to FileA to produce FileB, and d4 will be applied to FileD to produce FileC.

Although the example shown in FIG. 11 is of a container with extraction by name, it could easily be replaced with an example of a container with random access extraction.

In general, dynamic containers that are not self-contained and have internal delta dependencies can be represented, authored and expanded using the unified framework described herein and the system of FIG. 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX A

This is an example XML schema for an XML-based index of a container.

```xml
<?xml version="1.0" encoding="utf-8" ?>
<!-- // Copyright (c) Microsoft Corporation. All rights reserved.-->
<xs:schema xmlns:xs="http://www.w3.org/2001/XMLSchema" targetNamespace="urn:ContainerIndex"
    xmlns:cix="urn:ContainerIndex" elementFormDefault="qualified">
    <xs:element name="Container">
        <xs:complexType>
            <xs:sequence>
                <xs:element name="Description" type="xs:string" minOccurs="0" maxOccurs="1" />
                <xs:element name="Hash" type="cix:HashType" minOccurs="0" maxOccurs="unbounded" />
                <xs:element name="Search" minOccurs="0" maxOccurs="1">
                    <xs:complexType>
                        <xs:sequence>
                            <xs:element name="Location" minOccurs="0" maxOccurs="unbounded">
                                <xs:complexType>
                                    <xs:attribute name="id" type="xs:unsignedInt" use="required" />
                                    <xs:attribute name="path" type="xs:string" use="required" />
                                    <xs:attribute name="flags" type="xs:hexBinary" use="optional" />
                                </xs:complexType>
                            </xs:element>
                            <xs:element name="Alias" minOccurs="0" maxOccurs="unbounded">
                                <xs:complexType>
                                    <xs:attribute name="target" type="xs:string" />
                                    <xs:attribute name="source" type="xs:string" />
                                </xs:complexType>
                            </xs:element>
                        </xs:sequence>
                    </xs:complexType>
                </xs:element>
                <xs:element name="Files" type="cix:FilesType" minOccurs="1" maxOccurs="1" />
            </xs:sequence>
            <xs:attribute name="name" type="xs:string" use="required" />
            <xs:attribute name="type" type="cix:Enum_ContainerTypes" use="required" />
            <xs:attribute name="length" type="xs:unsignedLong" use="required" />
        </xs:complexType>
        <xs:key name="FileIDKey">
            <xs:selector xpath="cix:Files/cix:File" />
            <xs:field xpath="@id" />
        </xs:key>
        <xs:key name="LocationIDKey">
            <xs:selector xpath="cix:Search/cix:Location" />
            <xs:field xpath="@id" />
        </xs:key>
    </xs:element>
    <xs:complexType name="FilesType">
        <xs:sequence>
            <xs:element name="File" maxOccurs="unbounded">
                <xs:complexType>
                    <!-- File children-->
                    <xs:sequence>
                        <xs:element name="Hash" type="cix:HashType" minOccurs="0" maxOccurs="unbounded" />
                        <xs:element name="Recipe" minOccurs="0" maxOccurs="unbounded">
                            <xs:complexType>
                                <xs:sequence>
                                    <!--
                                    1. Source without Basis is just a self-contained fallback with no dependency
                                       (source might be PA19, PA30, or RAW).
                                    2. Basis without Source is a dependency copy, no delta to be applied.
                                    3. Source with Basis is ordinary delta and cannot be RAW.
                                    4. Neither Source nor Basis must be zero length target file.
                                    -->
```

APPENDIX A-continued

This is an example XML schema for an XML-based index of a container.

```xml
            <xs:element name="Source" type="cix:SourceType" minOccurs="0" maxOccurs="1" />
            <xs:element name="Basis" minOccurs="0" maxOccurs="1">
              <xs:complexType>
                <xs:sequence>
                  <xs:element name="Hash" type="cix:HashType" minOccurs="0"
                      maxOccurs="unbounded" />
                </xs:sequence>
                <xs:attribute name="file" type="xs:unsignedInt" use="optional" />
                <xs:attribute name="loc" type="xs:unsignedInt" use="optional" />
                <xs:attribute name="length" type="xs:unsignedLong" use="optional" />
              </xs:complexType>
            </xs:element>
          </xs:sequence>
        </xs:complexType>
        <xs:keyref name="LocationReference" refer="cix:LocationIDKey">
          <xs:selector xpath="cix:Basis" />
          <xs:field xpath="@loc" />
        </xs:keyref>
        <xs:keyref name="FileReference" refer="cix:FileIDKey">
          <xs:selector xpath="cix:Basis" />
          <xs:field xpath="@file" />
        </xs:keyref>
      </xs:element>
    </xs:sequence>
    <!-- File attributes -->
    <xs:attribute name="id" type="xs:unsignedInt" use="required" />
    <xs:attribute name="name" type="xs:string" use="required" />
    <xs:attribute name="length" type="xs:unsignedLong" use="required" />
    <xs:attribute name="time" type="xs:unsignedLong" use="optional" />
  </xs:complexType>
 </xs:element> <!-- /File -->
</xs:sequence>
</xs:complexType> <!-- /FilesType -->
<!--
Tier-2 types. These use only Simple Types inside them, and are nested inside more complicated
types defined above.
-->
<xs:complexType name="SourceType">
  <xs:sequence>
    <xs:element name="Hash" type="cix:HashType" minOccurs="0" maxOccurs="unbounded" />
  </xs:sequence>
  <xs:attribute name="type" type="cix:Enum_PAVersions" use="optional" />
  <xs:attribute name="offset" type="xs:unsignedLong" use="optional" />
  <xs:attribute name="length" type="xs:unsignedLong" use="optional" />
  <xs:attribute name="name" type="xs:string" use="optional" />
</xs:complexType>
<!--
Simple Types. Contain no nested elements, and are nested inside more complicated
types defined above.
-->
<xs:complexType name="HashType">
  <xs:attribute name="offset" type="xs:unsignedLong" use="optional" />
  <xs:attribute name="length" type="xs:unsignedLong" use="optional" />
  <xs:attribute name="alg" type="cix:Enum_HashAlgs" use="required" />
  <xs:attribute name="value" type="xs:hexBinary" use="required" />
</xs:complexType>
<!--
Enumerations
-->
<xs:simpleType name="Enum_PAVersions">
  <xs:restriction base="xs:string">
    <xs:enumeration value="RAW" />
    <xs:enumeration value="PA19" />
    <xs:enumeration value="PA30" />
  </xs:restriction>
</xs:simpleType>
<xs:simpleType name="Enum_ContainerTypes">
  <xs:restriction base="xs:string">
    <xs:enumeration value="PSF" />
    <xs:enumeration value="CAB" />
  </xs:restriction>
</xs:simpleType>
<xs:simpleType name="Enum_HashAlgs">
  <xs:restriction base="xs:string">
    <xs:enumeration value="CRC32" />
    <xs:enumeration value="SHA1" />
    <xs:enumeration value="SHA256" />
```

APPENDIX A-continued

This is an example XML schema for an XML-based index of a container.

```
      <xs:enumeration value="SHA384" />
      <xs:enumeration value="SHA512" />
    </xs:restriction>
  </xs:simpleType>
</xs:schema>
```

What is claimed is:

1. A method for delivery of target files, the method comprising:

encoding in an index one or more recipes for each of the target files using a framework that represents content delivery schemes comprising a conventional archive that contains a single copy of each target file, a delta archive that contains a delta file that encodes how each target file differs from its earlier version, an intra-package delta that contains a copy of a first target file and a delta file that describes how a second target file differs from the first target file, and, an extra-package delta that contains a delta file that is applied to an external basis file, the content delivery schemes involving static containers, dynamic containers, self-contained containers, containers that are not self-contained, containers with internal delta dependency and containers with no internal delta dependency, each recipe provides a mechanism for generation of an associated target file.

2. The method of claim 1, wherein encoding the one or more recipes in the index comprises:

encoding in the index a single recipe for each of the target files.

3. The method of claim 1, wherein encoding the one or more recipes in the index comprises:

encoding in the index two or more recipes for at least one of the target files.

4. The method of claim 1, wherein encoding the one or more recipes in the index comprises:

specifying at most one source file and one basis file in each recipe;

representing a target file that is produced by copying or decompressing a particular file with a recipe that specifies as its source file the particular file; and representing a target file that is synthesized by applying a particular delta file to a particular basis file with a recipe that specifies as its source file the particular delta file and specifies as its basis file the particular basis file.

5. The method of claim 4, wherein encoding the one or more recipes in the index comprises:

representing internal delta dependency with a recipe of a particular target file that identifies its basis file as a different one of the target files.

6. The method of claim 4, wherein encoding the one or more recipes in the index comprises:

representing lack of self containment by specifying in the index one or more search locations where basis files can be searched for.

7. The method of claim 4, wherein encoding the one or more recipes in the index comprises:

representing lack of self containment by specifying in the index one or more search locations where source files and basis files can be searched for.

8. The method of claim 4, further comprising:

packaging the index and source files of the recipes in a container.

9. The method of claim 4, further comprising:

including in the index meta-data about one or more of the target files, the source files and the basis files.

10. The method of claim 1, the index represents a container associated with the target files and further provides metadata on one or more content delivery solutions associated with the container associated with the target files.

11. A computer storage medium having stored thereon a data structure, comprising:

an index describing one or more recipes for the production of target files, each recipe provides a mechanism for generation of an associated target file, wherein the index uses a framework that represents content delivery schemes comprising a conventional archive that contains a single copy of each target file, a delta archive that contains a delta file that encodes how each target file differs from its earlier version, an intra-package delta that contains a copy of a first target file and a delta file that describes how a second target file differs from the first target file, and, an extra-package delta that contains a delta file that is applied to an external basis file, the content delivery schemes involving static containers, dynamic containers, self contained containers, containers that are not self-contained, containers with internal delta dependency and containers with no internal delta dependency.

12. The computer storage medium of claim 11, wherein the index includes a single recipe for each of the target files.

13. The computer storage medium of claim 11, wherein the index includes two or more recipes for at least one of the target files.

14. The computer storage medium of claim 11, wherein the index specifies at most one source file and one basis file in each recipe, a target file that is produced by copying or decompressing a particular file is represented with a recipe that specifies as its source file the particular file, a target file that is synthesized by applying a particular delta file to a particular basis file is represented with a recipe that specifies as its source file the particular delta file and specifies as its basis file the particular basis file.

15. The computer storage medium of claim 14, wherein internal delta dependency is represented in the index with a recipe of a particular target file that identifies its basis file as a different one of the target files.

16. The computer storage medium of claim 14, wherein lack of self containment is represented in the index by one or more search locations where basis files can be searched for.

17. The computer storage medium of claim 14, wherein lack of self containment is represented in the index by one or more search locations where source files and basis files can be searched for.

18. The computer storage medium of claim 14, wherein the data structure further comprises:
   source files of the recipes.

19. The computer storage medium of claim 14, wherein the index includes meta-data about one or more of the target files, the source files and the basis files.

20. The method of claim 10, the index further including a signature for the container associated with the target files, the signature used for validation that the container associated with the target file was not maliciously modified in transit.

* * * * *